July 2, 1946.  W. S. GRAHAM  2,403,360
AGRICULTURAL IMPLEMENT
Filed May 15, 1944
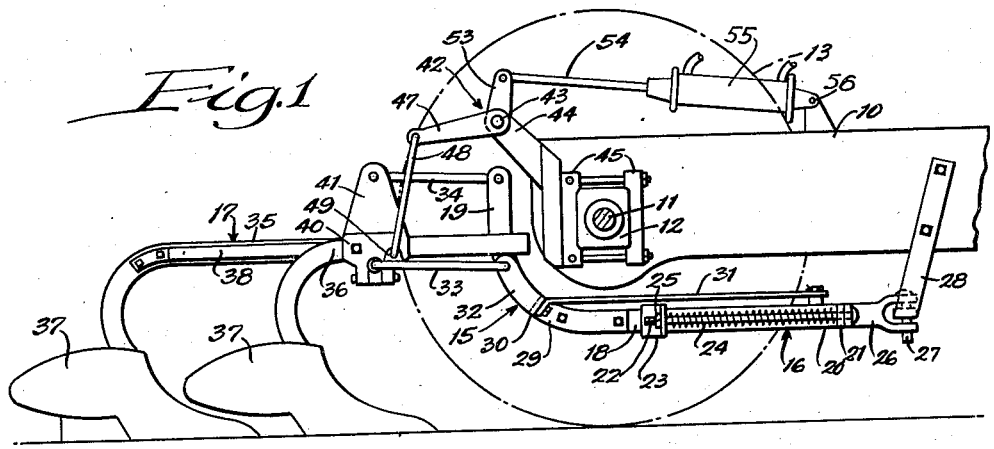
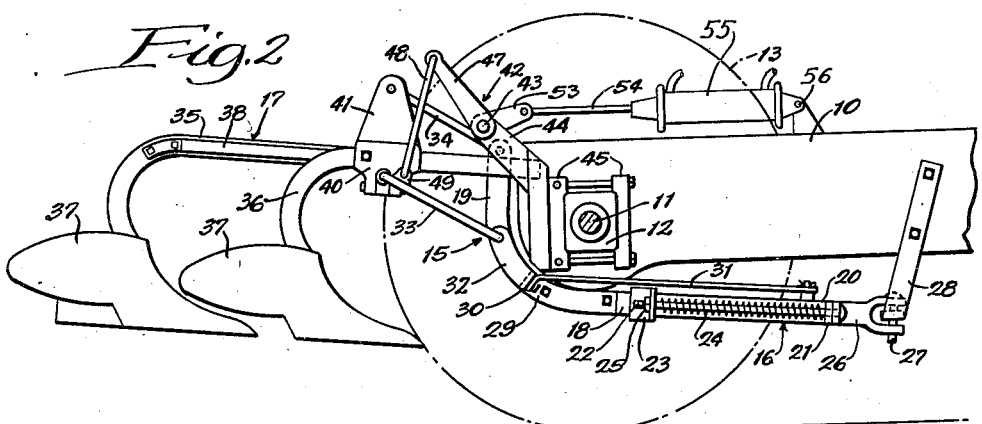
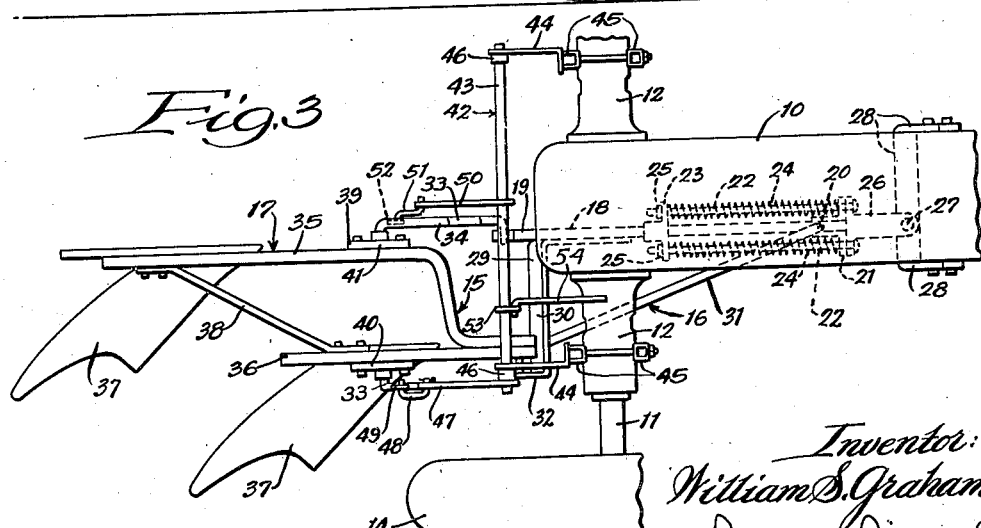
Inventor:
William S. Graham,
By Paul O. Pippel
Attorney.

Patented July 2, 1946

2,403,360

UNITED STATES PATENT OFFICE 2,403,360

AGRICULTURAL IMPLEMENT

William S. Graham, Canton, Ill., assignor to International Harvester Company, a corporation of New Jersey Application May 15, 1944, Serial No. 535,637

5 Claims. (Cl. 97—47)

This invention relates to agricultural implements and particularly to tractor-mounted plows.

In plows of the tool beam type wherein an elongated plow beam is utilized having plow bottoms at the rear end thereof, the forward end of the beam is generally pivotally attached to the tractor at a location considerably in advance of the rear wheels, and the tool-supporting end extends rearwardly thereof. While this solid beam construction is desirable when the plow is in operating position, the undercarriage of the tractor interferes with the upward movement of the plow to transport position, with the result that the tool-carrying rear end of the beam does not attain sufficient height above the ground for clearance.

The present invention is designed to overcome this disadvantage and has for an object the provision of a novel tool beam construction for tractor-mounted implements.

Another object is to provide a novel plow beam structure wherein the rear portion of the beam executes an additional upward movement relative to the forward portion thereof when the plow is raised for transport.

Still another object is to provide a novel beam structure for plows and the like wherein the beam consists of separate forward and rearward portions connected by parallel links, and wherein the rear portion is permitted to move upwardly with respect to the front portion but not downwardly.

Other objects and advantages of the invention will become clear from the following detailed description when read in conjunction with the accompanying drawing, wherein:

Figure 1 is a view in side elevation of the rear end of a tractor with one wheel removed and showing a plow embodying the features of the present invention attached thereto;

Figure 2 is a view similar to Figure 1, showing the plow in transport position; and Figure 3 is a plan view of the structure shown in Figure 1.

In the drawing:

Numeral 10 designates the longitudinally extending body portion of a tractor having a transverse rear axle 11 journaled in a housing 12 and carrying laterally spaced rear drive wheels 13 and 14 at opposite ends thereof.

The plow of the present invention embodies a longitudinally extending beam structure 15 including separate forward and rearward sections 16 and 17, respectively. Forward section 16 comprises a beam portion 18 having a vertically extending portion 19 at the rear end thereof. The forward end of beam 18 has secured thereto an angle member 20 having laterally extending flanges 21 provided with laterally spaced openings to receive for sliding movement longitudinally extending bolts 22. Slidably mounted upon beam 18 rearwardly of member 20 is a similar beam flanged member 23 apertured to receive the ends of bolts 22. Members 20 and 23 are spaced by springs 24 surrounding bolts 22 and held by nuts 25 threaded to the ends of bolts 22. The forward ends of bolts 22 extending through member 20 are seated in the laterally extending flanges of a clevis 26 bifurcated at its forward end and apertured to receive a vertically extending pin 27, by which the forward section 16 is attached to a U-shaped bracket 28, secured to the forward portion of the tractor body. Thus forward section 16 serves as a flexible hitch connection for the plow of the present invention.

To the side of beam 18 near its rear end there is secured an angle member 29 having a laterally extending arm 30. Arm 30 is further braced with respect to the beam 18 by a strap 31. Arm 30 is bent at its outer end to form an upwardly extending member 32 generally parallel to the portion 19 but terminating considerably short of the upper end thereof.

Pivoted in the upper end of member 32 and at the base of portion 19 are laterally spaced parallel links 33. Likewise pivoted in an opening in the upper end of portion 19 is a link 34 parallel to the links 33 and vertically spaced therefrom.

Rear portion 17 of beam structure 15 comprises longitudinally extending members 35 and 36 bent downwardly at their rear ends to provide for the attachment thereto of plow bottoms 37. It will be noted that member 35 extends somewhat rearwardly of member 36 in the conventional manner for a two-furrow plow, and the forward end thereof is bent laterally and secured to the forward end of member 36. Members 35 and 36 are further spaced and strengthened by a strap 38. The forward ends of members 35 and 36 extend somewhat in advance of the rear vertical portion of beam 18 and are adapted to rest upon the arm 30 when the plow is in operative position.

Secured to the sides of members 35 and 36 are bearings 39 and 40, respectively, adapted to receive for pivotal movement the rear ends of links 33. Bearing 39 has an upright extension 41 apertured at its upper end to receive the rear end of link 34. Thus it is clear that forward and rearward sections 16 and 17 of beam structure 15 are connected by parallel links 33 and 34, and that the upright portion 19 of beam 18 is rearwardly of the tractor body 10.

Vertical movement of the plow of the present invention to and from working position is accomplished by a lifting mechanism generally indicated at 42. This lifting mechanism includes a transverse rock-shaft 43 rockably supported in openings in the upper ends of laterally spaced brackets 44 at opposite sides of the tractor body 10 and secured to attaching structures 45 clamped to the rear axle housing 12. Rock-shaft 43 is held against displacement in brackets 44 by collars 46. To the right-hand end of shaft 43 is secured an arm 47, the outer end of which is connected by a link 48 to a lug 49 projecting from the right-hand link 33. Likewise secured to shaft 43 is another arm 50 parallel to the arm 47 and connected by a link 51 with a lug 52 on the left-hand link 33. Rocking of the shaft 43 is accomplished through an arm 53 projecting upwardly from shaft 43 and having attached thereto a forwardly extending rod 54. Rod 54 may be reciprocated by any suitable means to rock the shaft 43, such as a conventional lever and quadrant arrangement or a power-lift mechanism in the form of a hydraulic cylinder 55 preferably deriving energy from the tractor motor and anchored to the tractor at 56.

In Figure 1, the plow bottoms 37 are shown resting upon the surface of the ground. In this position, the sections 16 and 17 of beam structure 15 are in parallel relation, and section 17 rests upon the arm 30 secured to beam 18. From a consideration of Figure 1, it will be clear that when the plow is raised by actuating the lift mechanism 42, the entire beam structure 15 will be raised until the rear portion of section 16 contacts the undercarriage of the tractor body 10. As indicated in Figure 2, when section 16 first contacts the body 10, the plow bottoms 37 will be fairly close to the ground, and sufficient clearance would not normally be provided. With the mechanism of the present invention, upon contact of section 16 with the tractor body, section 17 will continue to rise, as shown in Figure 2, and by virtue of its parallel link connection, will maintain a substantially parallel relation with the section 16. Thus section 17, carrying the working tools 37, is assured substantial clearance above the ground when the plow is elevated upon the tractor for transport purposes, and upon return to ground-working position the plow bottoms 37 will change their angle with respect to the ground only slightly.

Having described the invention, it should be understood that modifications may be made therein without departing from the spirit of the invention or the scope of the appended claims.

What is claimed is:

1. In an agricultural implement, a supporting structure, an elongated tool-carrying member pivoted at one end on the supporting structure for vertical movement relative thereto, said member comprising separate forward and rearward sections, vertically spaced generally parallel links connecting said sections, and stop means limiting relative movement of said sections in one direction.

2. In an agricultural implement, a supporting structure, an elongated tool-carrying member comprising separate front and rear sections, tools carried by the rear section, means for pivotally attaching the front section to said supporting structure for vertical movement, the vertical movement of said front section being limited by engagement thereof with said supporting structure, vertically spaced parallel links connecting said sections for relative movement, power lift means on said supporting structure, and means connecting said lift means and said rear section for vertically moving said tool-carrying member.

3. In combination with a tractor having a rear axle, laterally spaced rear drive wheels and a longitudinally extending body, a longitudinally extending beam structure comprising a front hitch section pivoted at its forward end to the tractor at a location in advance of the rear axle and extending to a location rearwardly thereof, a separate rear tool-carrying section, means connecting said sections for relative translational movement, lift means on the tractor, means connecting said lift means and said rear section for effecting pivotal movement of said beam structure and translational movement of said rear section with respect to said front hitch section, and stop means arranged to limit downward movement of said rear section with respect to said front section.

4. In combination with a tractor having a rear axle, laterally spaced rear drive wheels and a longitudinally extending body, a longitudinally extending beam structure comprising separate front and rear sections, said front section extending from a point rearwardly of said rear axle to a location in advance thereof and having a vertically extending rear end portion, means pivotally connecting the forward end of said front section to the tractor for vertical movement, vertically spaced rearwardly extending parallel links pivoted on said vertically extending portion, tools carried by said rear section, means connecting said rear section to the free ends of said links for vertical translational movement with respect to said front section, lift means on the tractor, means connecting said lift means with said rear section for vertical movement thereof, and means limiting downward movement of said rear section with respect to said front section.

5. The combination with a tractor having a rear axle, laterally spaced rear drive wheels and a longitudinally extending body, a longitudinally extending beam structure comprising a forward hitch section pivotally connected to the tractor at a location in advance of the rear axle and extending to a location in rear thereof, said hitch section being adapted to engage the body of the tractor to limit vertical movement thereof, and a separate rearward tool-carrying section in generally parallel relation with said hitch section, means connecting said sections for relative translational movement, lift means on the tractor, and means connecting said lift means and said tool-carrying section for successively effecting vertical pivotal movement of said beam structure and vertical translational movement of said tool-carrying section with respect to said hitch section, while maintaining the generally parallel relation of said sections.

WILLIAM S. GRAHAM.